Fig. 9.

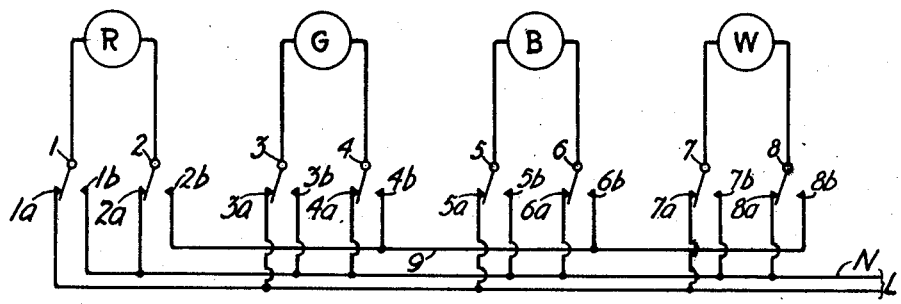
Fig. 1.
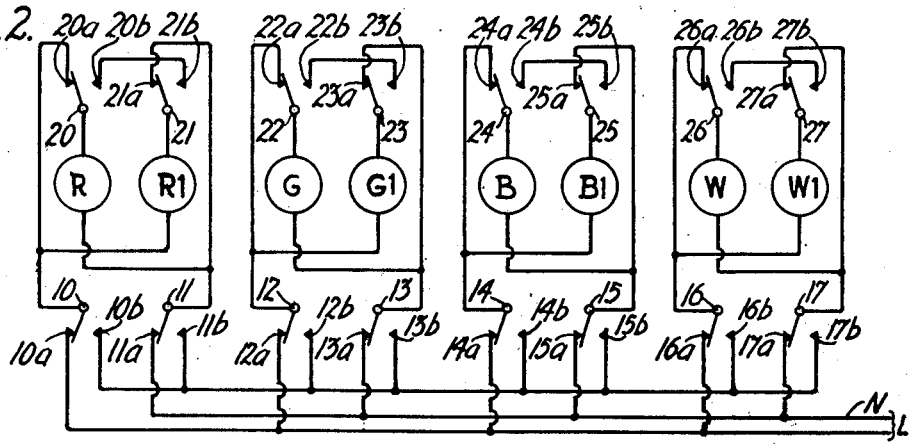
Fig. 2.
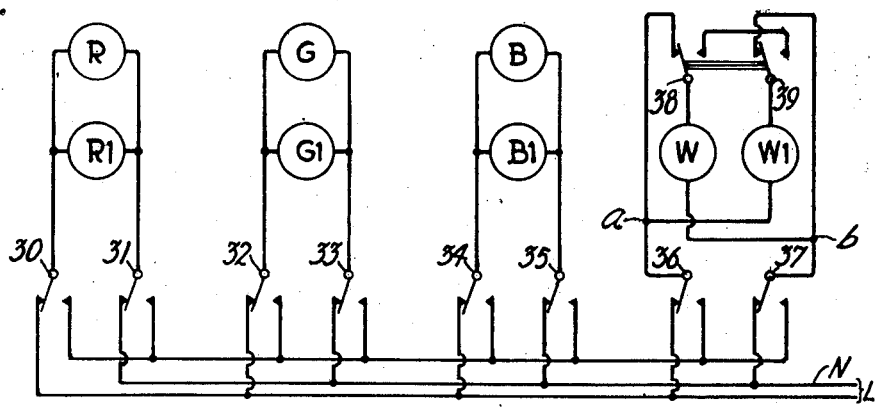
Fig. 3.
Inventor:
Rollo Gillespie Williams Inventor:
Rollo Gillespie Williams

| % Total Load | No. | Final Color Mixture | Micro-Switch Operation (Fig. 3.) | | | | | | | | | Lamp Voltages | | | | | % Output of Light Sources | | | |
|---|---|---|---|---|---|---|---|---|---|---|---|---|---|---|---|---|---|---|---|---|
| | | | 30 | 31 | 32 | 33 | 34 | 35 | 36 | 37 | 38 | R | G | B | W | W1 | R | G | B | W |
| 25 | 1 | Blue | X | X | X | X | – | – | X | X | X | – | – | 118 | – | – | – | – | 100 | – |
| 44 | 2 | Deep Cerise | – | X | X | – | – | – | X | X | X | 59 | 59 | 118 | – | – | 7 | 7 | 100 | – |
| 46 | 3 | Cerise | – | X | X | – | – | – | X | – | X | 75 | 43 | 118 | 21.5 | 21.5 | 20 | 1.2 | 100 | – |
| 48 | 4 | Mauve | – | X | X | – | – | – | X | – | – | 92 | 26 | 118 | 26 | 26 | 40 | – | 100 | – |
| 50 | 5 | Magenta | – | – | X | – | – | – | X | X | X | 118 | – | 118 | – | – | 100 | – | 100 | – |
| 60 | 6 | Deep Pink | – | – | X | – | – | – | – | X | X | 118 | 12 | 118 | 53 | 53 | 100 | – | 100 | 4.7 |
| 71 | 7 | Pink | – | – | X | – | – | – | – | X | – | 118 | 59 | 118 | 59 | 59 | 100 | 7 | 100 | 7 |
| 75 | 8 | Flesh White | – | – | X | X | – | – | – | – | – | 118 | – | 118 | 118 | 118 | 100 | – | 100 | 100 |
| 50 | 9 | Warm White | – | – | – | X | – | X | – | – | – | 118 | – | – | 118 | 118 | 100 | – | – | 100 |
| 47 | 10 | Gold | – | – | – | X | – | X | X | – | – | 118 | 26 | 26 | 92 | 92 | 100 | – | – | 40 |
| 43 | 11 | Copper | – | – | – | X | X | X | X | – | – | 118 | 59 | – | 59 | 59 | 100 | 7 | – | 7 |
| 34 | 12 | Flame | – | – | – | X | X | X | X | – | X | 118 | 12 | – | 53 | 53 | 100 | – | – | 4.7 |
| 43 | 13 | Orange | – | – | – | X | X | – | X | X | X | 118 | 59 | 59 | – | – | 100 | 7 | 7 | – |
| 25 | 14 | Red | – | – | – | X | X | X | X | X | X | 118 | – | – | – | – | 100 | – | – | – |
| 44 | 15 | Orange | – | – | – | X | X | – | X | – | X | 118 | 75 | 43 | 21.5 | 21.5 | 100 | 20 | 1.2 | – |
| 47 | 16 | Yellow | – | – | – | X | X | – | X | – | – | 118 | 92 | 26 | 26 | 26 | 100 | 40 | – | – |
| 43 | 17 | Deep Gold | – | – | – | X | X | X | X | – | – | 118 | 59 | – | 59 | 59 | 100 | 7 | – | 7 |
| 47 | 18 | Gold | – | – | – | X | – | X | X | – | – | 118 | 26 | 26 | 92 | 92 | 100 | – | – | 40 |
| 50 | 19 | Warm White | – | – | – | X | – | X | – | – | – | 118 | – | – | 118 | 118 | 100 | – | – | 100 |
| 75 | 20 | Gold White | – | – | – | – | X | X | – | – | – | 118 | 118 | – | 118 | 118 | 100 | 100 | – | 100 |
| 50 | 21 | Green White | – | X | – | – | – | X | – | – | – | – | 118 | – | 118 | 118 | – | 100 | – | 100 |
| 46 | 22 | Pale Lime | – | X | – | – | – | X | X | – | – | 26 | 118 | 26 | 92 | 92 | – | 100 | – | 40 |
| 43 | 23 | Pale Green | – | X | – | – | X | X | X | – | – | 59 | 118 | – | 59 | 59 | 7 | 100 | – | 7 |
| 34 | 24 | Deeper Green | – | X | – | – | X | X | X | – | X | 12 | 118 | – | 53 | 53 | – | 100 | – | 4.7 |
| 46 | 25 | Apple Green | – | X | – | – | X | – | X | – | X | 75 | 118 | 43 | 21.5 | 21.5 | 20 | 100 | 1.2 | – |
| 43 | 26 | Deep Lime | – | X | – | – | X | – | X | X | X | 59 | 118 | 59 | – | – | 7 | 100 | 7 | – |
| 25 | 27 | Green | X | X | – | – | X | – | X | X | X | – | 118 | – | – | – | – | 100 | – | – |
| 43 | 28 | Bluish Green | – | X | – | – | X | – | X | X | X | 59 | 118 | 59 | – | – | 7 | 100 | 7 | – |
| 46 | 29 | Peacock | – | X | – | – | X | – | – | X | X | 43 | 118 | 75 | 21.5 | 21.5 | 1.2 | 100 | 20 | – |
| 47 | 30 | Deep Turquoise | – | X | – | – | X | – | – | X | – | 25 | 118 | 92 | 26 | 26 | – | 100 | 40 | – |
| 50 | 31 | Turquoise | – | X | – | – | – | – | X | X | X | – | 118 | 118 | – | – | – | 100 | 100 | – |
| 59 | 32 | Pale Turquoise | – | X | – | – | – | – | X | – | X | 12 | 118 | 118 | 53 | 53 | – | 100 | 100 | 4.7 |
| 68 | 33 | Sky Blue | – | X | – | – | – | – | X | – | – | 59 | 118 | 118 | 59 | 59 | 7 | 100 | 100 | 7 |
| 46 | 34 | Blue White | – | X | – | X | – | – | X | – | – | 26 | 26 | 118 | 92 | 92 | – | – | 100 | 40 |
| 50 | 35 | Cold White | – | X | – | X | – | – | – | – | – | – | – | 118 | 118 | 118 | – | – | 100 | 100 |
| 46 | 36 | Blue White | – | X | – | X | – | – | X | – | – | 26 | 26 | 118 | 92 | 92 | – | – | 100 | 40 |
| 44 | 37 | Pale Violet | X | X | – | X | – | – | X | – | – | – | 59 | 118 | 59 | 59 | – | 7 | 100 | 7 |
| 34 | 38 | Lavender | X | X | – | X | – | – | X | – | X | – | 12 | 118 | 53 | 53 | – | – | 100 | 1.2 |

Inventor:
Rollo Gillespie Williams
by
Atty.

Patented July 7, 1953

2,644,912

UNITED STATES PATENT OFFICE 2,644,912

COLOR LIGHTING CONTROL SYSTEM

Rollo Gillespie Williams, Great Neck, N. Y., assignor, by mesne assignments, to Duro-Test Corporation, North Bergen, N. J., a corporation of New York Application March 13, 1951, Serial No. 215,271

7 Claims. (Cl. 315—191)

This invention relates to color lighting control systems and particularly to a system for the production of light of a desired hue of color by combining colors of illumination from electrical sources of colored light, the system being characterized by the arrangement of selected light sources in an electrical network across the source of voltage, the arrangement being such that the intensity of light from the sources of color required for the creation of illumination of the desired hue of color will be in part controlled by the resistance of other light sources in said network which produce no perceptible illumination as thus connected.

In the control of lighting systems for theatres, store windows, and other places where light, and particularly colored light, is essential, it has been customary heretofore to use dimmers to control the voltage applied to the several sources of light and thereby to adjust the light values of the several sources of color. It is well known that dimmers represent a considerable item of expense in the construction of lighting control systems of the purposes above stated. I have found that it is possible to obtain a wide range of hues of color of light by combining the light from selected sources of colored light and simultaneously controlling the magnitudes of the voltages across those selected sources by arranging them in a network across a supply circuit, the network embracing those sources of color that enter into the production of the desired hue of color and also other sources of color, the said other sources of color serving merely as control members to adjust the voltages across the sources of color that enter into the production of the desired hue so that the latter sources will produce light in the various proportions required for the creation of a light mixture of the desired hue of color.

Another feature of this invention resides in the selection of electrical sources of colored light by means of cam-controlled microswitches or other convenient type of two-position switch and connecting the selected sources to a source of voltage, the switching arrangement being such that the voltage applied to the sources may be either the full line voltage or fractions thereof, the reduction in voltage being effected by connecting desired sources in a network across a supply circuit and by utilizing the resistance property of certain of the light sources to control the voltages across other light sources whose luminosity at predetermined light values is essential to the production of a desired hue of color.

The invention will be clearly understood from the following description when read in connection with the drawings in which:

Fig. 1 is a circuit diagram showing a simple form of embodiment of the invention;

Fig. 2 is a circuit diagram showing a form of the invention in which each color is provided by two electrical sources of light with switching means by which the sources may be connected in series or parallel with each other and the range of control further extended;

Fig. 3 is a circuit diagram in which the white lamps only are arranged to be connected in either series or parallel with each other, the other lamps being arranged permanently in parallel with each other;

Fig. 9 is a chart illustrating the operation of the circuit of Fig. 3.

Figure 4:
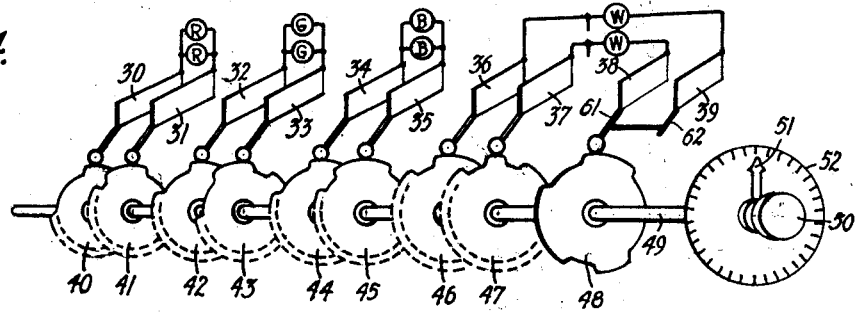
Fig. 4 shows schematically an arrangement of cams upon a common shaft by which the microswitches of the control circuit of Fig. 3 may be operated in desired combinations to effect the hues of color indicated on Fig. 9.

In the embodiments of the invention shown in the several figures of the drawings four hues of color, viz., red, green, blue, and white are shown for illustrative purposes but it is to be understood that other hues of color of light sources may be employed if desired. Those sources of light are preferably gas-filled white lamps, with red, green, and blue filters, or colored lamps may be used. Referring to Fig. 1, the control circuit there shown employs eight microswitches, designated 1 to 8, inclusive, although other types of two-position switches may be used. Each source of light is connected to the movable contactor of two of the microswitches; thus the red lamp is connected to the contactors of switches 1 and 2, the green lamp to the contactors of switches 3 and 4, and in like manner, the blue and white lamps are connected to the contactors of the remaining switches. Each source of light may consist of a simple unit, viz., a single lamp as indicated in Fig. 1 or a plurality of units as in Figs.

2 and 3. The "hot side" of the line L is connected to contact points 1a, 3a, 5a and 7a, of switches 1, 3, 5, 7, respectively. The neutral side of the line is connected to contact points 1b, 3b, 5b, and 7b, of switches 1, 3, 5, and 7, respectively, and also to contact points 2a, 4a, 6a, and 8a, of switches 2, 4, 6, and 8, respectively. Contact points 2b, 4b, 6b, and 8b, are connected to a common conductor 9 through which it is possible to effect a series connection or a series-parallel connection of certain lamps and thereby to obtain a range of voltages that simulates that attainable only by a dimmer. The manner in which the many and varied color effects are produced by the switching mechanism shown in Figs. 1 is as follows:

Assuming that one of the basic colors, say, blue, is desired, the contactors of all switches except 5 and 6 would be moved to their right hand contacts. This would leave only switches 5 and 6 connected across the line L, and, in consequence, the blue lamp only will be illuminated. If it is desired to change the color of illumination from blue to rose, the blue lamp will be left connected across the line and the red and green, in series, will also be connected across the line by the operation to the right of the switches 2, 3, 4, and 7. This establishes a circuit from the hot side of the line, through contact 1a, the red lamp, contact 2b, conductor 9, contact 4b, the green lamp, and contact 3b to the neutral side of the line L. The closing of contact 7b disconnects the white lamp from the line. In the network thus arranged, full voltage, say 118 volts, will be applied to the blue lamp and one-half of the full voltage, or 59 volts, to each of the red and green lamps. The light intensity of blue light is, of course, the maximum but the intensity of red and green is not one-half the maximum but only about seven percent of that which would prevail at maximum voltage. The combining of red, green, and blue, having the light values just stated, results in the desired hue of color, namely, rose. It is to be understood that the values of light intensity mentioned are the values of the light from each white source which is behind a color filter; those values are not the values of the colored light emanating from the filter.

In order to obtain closer adjustment of voltage, an arrangement such as that shown in Fig. 2 may be employed. This arrangement employs sixteen microswitches eight of which, designated 10 to 17, inclusive, which are the main switches, have certain contact points connected to the hot side of the line, other contact points connected to the neutral side N of the line, and still others connected to a common conductor 18. Thus contact points 10a, 12a, 14a, and 16a, are connected to the hot side of the line; contacts 11a, 13a, 15a, and 17a, are connected to the neutral conductor; and the "b" contacts of all switches are connected to a common conductor, 18. The movable contactors of each pair of the aforesaid microswitches 10 to 17, inclusive, are connected to one or more pairs of lamps through another pair of microswitches, designated auxiliary switches, the purpose of the latter switches being to connect the lamps of each pair in parallel or in series with each other. Thus, referring to the red lamps R and R1 and their associated switches, it will be seen that with the contactors of switches 10 and 11 upon contacts 10a and 11a, and with the contactors of auxiliary switches 20 and 21 upon contacts 20a and 21a, the lamps R and R1 will be connected in parallel across the line L. When the contactors of switches 20 and 21 are moved to contacts 20b and 21b, the lamps R and R1 will then be connected in series across the line. The ability to connect both lamps of the same color in series or in parallel with each other, combined with the ability to connect the pairs of lamps of different colors in series, or parallel, or series-parallel, greatly increases the range of steps of lighting intensity of the circuit of Fig. 2, and, in consequence, increases the color range of the light sources of the circuit.

However, it is not necessary to provide for the connection of all pairs of sources of colors in series or parallel as shown in Fig. 2. Extremely satisfactory color results are attainable by a circuit such as that shown in Fig. 3 in which the lamps of each of the pairs, red, green, and blue, are permanently connected in parallel, and only the white lamps are arranged for connection in series or in parallel with each other as desired. The wide range of hues of color attainable by variations of the circuit shown on Fig. 3 is indicated upon the chart, Fig. 9. Referring to that figure (which shows the operating conditions of the circuit of Fig. 3 to create the colors there shown) it will be seen that in order to produce the hue of color designated "cerise" the contactors of switches 30, 33, 34, 35, and 37, are allowed to remain in the positions shown in Fig. 3, but the contactors of switches 31, 32, 36, 38 and 39 (the latter two being coupled together) are moved to the opposite positions. As the result of that setting of the switches, an electrical network is formed in which the pair of red lamps, which are in parallel, are connected in series with the pair of green lamps which are in parallel, the pair of green lamps being shunted by the two white lamps which are in series with each other, the entire network being connected between the hot side and the neutral side of the line; the pair of blue lamps in parallel is connected across the line. The voltages across the pairs of red, green and white lamps, as connected in the network just described, will be as follows: red, 75 volts; green, 43 volts; and across each of the white lamps, 21.5 volts. Each of the pair of blue lamps receives the full voltage of 118 volts from the line. The light intensity of the white sources of light behind the red, green, and blue filters resulting from those voltages are as shown in the next column of the chart, Fig. 9, the blue light being at full intensity, red at 20 percent, and green at 1.2 percent of full brightness. The white lamps, viz., those without color filters, make no contribution to the illumination—they serve merely as resistance elements. Their importance in this particular combination resides in influencing or contributing to the adjustment of the voltage of those lamps whose luminosity enters into the creation of the mixture of light having the desired hue of colored light. If the white lamps had not been employed in the network to shunt the green lamps in the manner indicated for color #3 in the chart, Fig. 9, the voltages across red and green would then have been evenly divided, i. e., 59 volts across each, and the resultant color would then be "deep cerise" which is color #2 in the said color chart.

The transition from "bluish green" to "turquoise" (colors #28 to #30), affords another illustration of the manner in which the hue of color of the light mixture may be varied by using certain lamps as voltage control elements and not as sources of illumination. To produce "bluish green," the switches are set so that the pair of green lamps, in parallel, is connected directly across the line and the pair of red lamps in series with the pair of blue lamps are connected across the line in a series-parallel arrangement; the white lamps are disconnected from the line. If the switch 36 is left in its normal position as shown in the figure, instead of being moved to its opposite position as in the production of "bluish green," the pair of red lamps which was in series with the pair of blue lamps across the line will be shunted by the two white lamps, in series, and the magnitudes of the voltages of the several lamps will be changed from what they were in the creation of "bluish green,"—red decreasing from 59 to 43 volts, blue increasing from 59 to 75 volts, green remaining unchanged at full voltage, and each white lamp receives 21.5 volts. Viewed from the standpoint of light intensity (Fig. 9), red has dropped from 7 to 1.2 percent, green remains at 100 percent, and blue has increased from 7 to 20 percent; white produces no luminous effect. The resulting color, #29 on the chart, is "peacock." The hue of color may be again changed by switching the white lamps into parallel relationship by restoring switches 38 and 39 to normal and leaving all other switches as they were for the production of "peacock." Upon referring to the chart, Fig. 9, it will be seen that the voltage of red is further reduced, falling to 25 volts, blue is further increased, rising to 92 volts, white is increased slightly, to 26 volts, and green remains at maximum voltage. Red and white have no perceptible effect upon the hue of color of the light mixture, that being entirely the result of green and blue; the resulting hue is color #30, viz., "deep turquoise."

To create those networks and to vary the connections to produce desired colors, the microswitches may, of course, be manipulated by hand, each being moved to the position indicated by the chart, Fig. 9, to establish the circuit connections for the production of a desired color. Such an arrangement would be laborious and open to the possibility of error in selection. To avoid that, an arrangement such as that shown in Fig. 4 may be used. That arrangement employs a plurality of cams, 40 to 48, inclusive, each of which coacts with a rider fastened to the contactor of one of the microswitches, 30 to 38, inclusive, so as to cause the contactor to make contact with one or the other of the contact points, depending upon the contour of the cam. Cams 46 and 47 control the operation of switches 36 and 37, the contactors of which are connected to the auxiliary switches 38 and 39 in the manner shown in Fig. 3. The contactors 61 and 62 of both of the latter switches are strapped together as there indicated and controlled by a single cam, as 48, so as to effect either series or parallel connections of the white lamps as desired. The cams may be on the same shaft, as shown in Fig. 4, or they may be grouped upon different shafts which would be geared together so that all cams will be under a single control. That control has a dial associated therewith upon which is indicated the colors that will result from the settings of the cams. If desired, the shaft 49 may be rotated continuously by a motor connected therewith, which would result in the continuous production by the lamps controlled thereby of the entire range of hues of color shown on the chart, Fig. 9. Means may also be provided for intermittent operation of the apparatus so that each hue of color will be displaced throughout a given length of time, such timing means being well known in the art.

Figure 5:
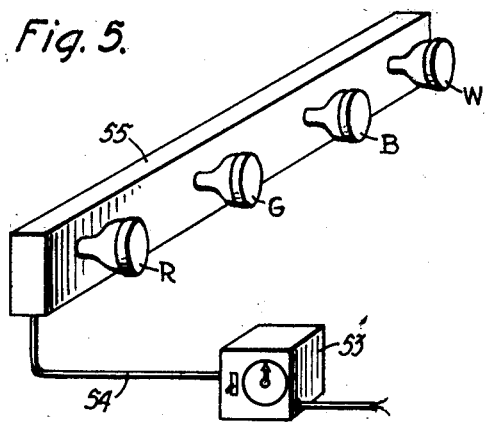
Fig. 5 shows an arrangement of the control apparatus with a four-color lighting strip.
Figure 6:
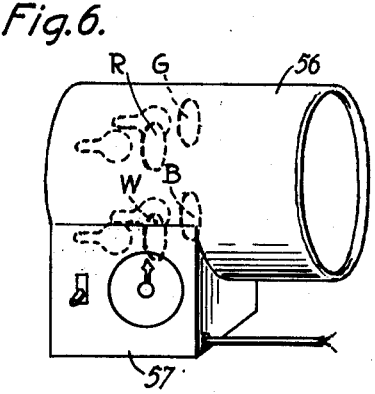
Fig. 6 shows a four-color spot-light having the control apparatus forming an integral part thereof.
Figure 7:
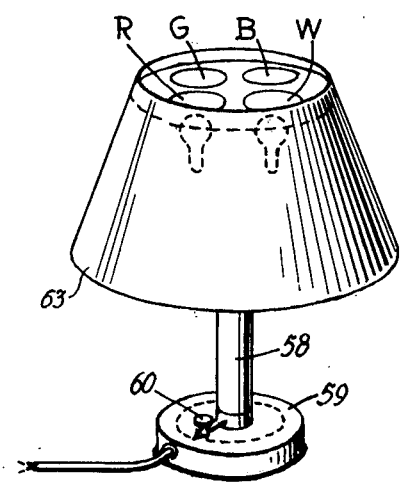
Fig. 7 shows the embodiment of the invention in a table-lamp or a floor-lamp, the lamps being arranged to cast colored light upward and white light downward.
Figure 8:
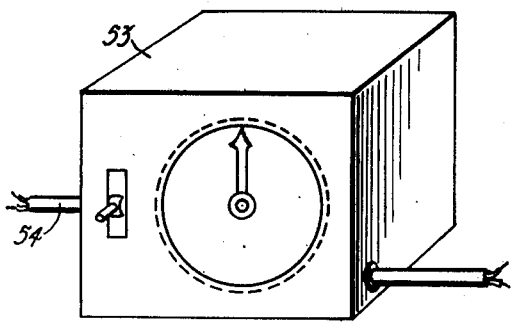
Fig. 8 shows in enlarged form the controller shown in Fig. 6.

Some of the various forms of embodiment of the invention are shown in Figs. 5 and 7, inclusive. In Fig. 5 the control apparatus 53 (shown in enlarged form in Fig. 8) which contains the cams and microswitches such as those shown in Fig. 4, is connected by a cable 54 with a lighting strip 55 which contains the white light sources and the filters by which the various colors of light there indicated may be produced. Although Fig. 5 shows but a single light source for each color, it is to be understood that in practice there could be a greater number of sources for each color. Fig. 6 shows the application of the invention to a spot-light 56. In this arrangement the control apparatus 57 is integrally connected with the structure of the spot-light. It is to be understood, of course, that the sources of light in Fig. 6 may be connected to the microswitches of the control apparatus 57 in the manner shown, for example, in Fig. 4. The arrangement shown in Figs. 5 and 6 lend themselves best to the production of color lighting in theaters, store windows and other places of a public or commercial type, but the invention is not limited to such use. It is often desired to have colored lighting in residential rooms the color of which may be changed at will from time to time. The lighting arrangement shown in Fig. 7 is designed to meet this need. The arrangement there shown is a table lamp which has in the upper portion thereof a plurality of color filters suitably supported by the frame work of the lamp. Beneath the filters are sources of white light suitably also supported by the framework of the lamp, the sources being positioned beneath the filters. The means for supporting the filters within the shade would be arranged to reflect downward the white light that does not pass through the filters. A shade 63 suitably supported by the framework, or otherwise, would be provided. With that arrangement the colored illumination will be projected upward to the ceiling of the room and the white light will be projected downward. By means of a switch 60 located upon the base 59 of the lamp, the setting of the microswitches may be adjusted at will to select the desired lamp and connect them in a network so as to produce desired hues of color of illumination upon the ceiling of the room. At the same time white light will be projected downward for reading or other purposes. The microswitches and the cams necessary to control the colored lamps may be placed in the vertical standard or post 58 of the lamp by suitably proportioning it to contain such switches, or they may be located in the base 59 of the lamp. It is to be understood, of course, that the invention may be embodied in a floor lamp or in any type of fixture where it is desired to project colored light upward and at the same time to have a controlled amount of light projected downward, the latter being optional.

It should also be understood that while the colors red, green, blue, and white, have been mentioned in describing the invention, other hues of color may be employed if desired, to obtain other color effects without in any way departing from the scope of the invention. Obviously, the change in the colors employed produces no change in the fundamental principle of the invention, namely, the utilization of certain selected sources of color merely as resistance elements to contribute to the adjustment of voltage across other selected sources of color that enter into the creation of a light mixture of the desired hue, the arrangement effecting voltage control of the sources of color that heretofore was attainable only by the use of a dimmer. This is clearly shown by the color chart, Fig. 9. Referring to that chart it will be seen that thirty-three distinct hues of colored light may be created by selecting and combining the light from only four sources, red, green, blue, and white, certain of the selected sources of color contributing merely to the control of the light value of other colors that combine to form the desired hue of color.

Further gradation in resistance values may be obtained by extending the principle embodied in the control circuit of the white lamps W and W1 shown in Fig. 3, to a circuit embodying two pairs of white lamps, each pair of which would be arranged in a subsidiary circuit precisely like that shown in Fig. 3 between the points $a$ and $b$; that is to say, each of those subsidiary circuits will contain a pair of white lamps W and W1, W2 and W3, and each pair would be connected to a pair of coupled microswitches such as 38 and 39. Those subsidiary circuits would not be connected directly to the contactors of switches 36 and 37 as is the circuit of the white lamps shown in Fig. 3. The connection of the subsidiary circuits to switches 36 and 37 would be through the circuit shown in Fig. 3 from which the white lamps are removed, leaving only the microswitches 38 and 39; that is to say, the circuit shown in Fig. 3 in which the connection between the point $a$ and the contactor of switch 39 (including the lamp W1) would be removed and also the connection between the point $b$ and the contactor of switch 38 (including the lamp W) would also be removed. Then, one of the subsidiary white circuits would be connected between the point $a$ and the contactor of switch 39 and the other subsidiary white circuit would be connected between the point $b$ and the contactor of switch 38. The circuit of the white lamps W, W1, W2 and W3 would then include the two subsidiary circuits each containing a pair of lamps and an intermediate connecting circuit bridged across the contactors of switches 36 and 37 and containing only switches 38 and 39. With the switches 36, 37, 38 and 39 in the positions shown in the drawing, each pair of white lamps would be connected across the supply circuit either in series or parallel depending upon the position of the coupled contactors of the switches in the subsidiary circuits. By moving the contactors of switches 38 and 39 to their opposite positions, the pairs of lamps W and W1, W2 and W3 will be connected in series across the supply circuit. By further manipulation of the coupled switches of the subsidiary circuits, the arrangement of the white lamps in the network may be further varied, which will afford greater gradation of resistance values. By increasing the number of subsidiary circuits each containing a pair of lamps and switches, the gradations of resistance may be increased until they closely approach that afforded by a dimmer.

While the invention has been disclosed as embodied in particular forms, it is to be understood that it is capable of embodiment in other forms without departing from the spirit and scope of the appended claims.

What is claimed is:

1. In a color lighting system, in combination, a plurality of electrical sources of light, the color of each of which differs from the colors of the other sources, each source of color comprising a plurality of lighting units, switching means to select the units of desired colors and to connect the selected units in a network across a source of voltage, the arrangement of the units being such that certain of the selected units serve merely as resistance elements contributing to the control of the voltage across other units in said network whose luminosity enters into the production of the mixture having the desired hue of color.

2. In a color lighting system, in combination, a plurality of electrical sources of light, each differing in color from the others, a control circuit having a source of voltage connected therewith and a plurality of switching means to select certain of said light sources and to connect the selected light sources to said control circuit, the light sources thus selected being so arranged in said control circuit that one of the light sources serves merely as a resistance to contribute to the control of the voltage across other selected light sources whose luminosity enters into the production of the desired hue of color.

3. In a color lighting system for the production of a desired hue of colored light by merging the illumination from selected sources of such light, in combination, a plurality of electrical sources of light each differing in color from the others, each of said sources comprising two units, a plurality of pairs of switches each pair being associated with one of said sources of light, the switches being so arranged as to connect each source of light directly across a source of voltage or to arrange the several sources in a network connected across said source of voltage, the arrangement being such that certain of the sources in said network serve merely to contribute to the control of the voltage across other sources without producing any perceptible luminosity.

4. In a color lighting system, in combination, a plurality of electrical lamps each differing in color from the others, a source of voltage, a plurality of two-way switches arranged in pairs, each pair being associated with one of said lamps, the switches being so arranged as to connect selected lamps in a network and to connect said network across the voltage source, the arrangement of the selected lamps in said network being such that one or more of said lamps serve merely as resistance elements to assist in controlling the voltage across other lamps whose luminosity enters into the creation of the light mixture of the desired hue.

5. The combination defined by claim 4 further characterized in that the light of each color is provided by a pair of lamps, each pair being connected with a pair of said switches, the connection between one of said pairs of lamps and the pair of switches associated therewith including switching means by which the lamps of the last mentioned pair may be connected in series or in parallel with each other.

6. In a color lighting system, in combination, a plurality of electrical lamps each differing in color from the others, a plurality of pairs of two-way switches, each pair being associated with one of said lamps, each lamp being connected between movable contact members of its associated pair of switches, a supply circuit the hot side of which is connected to one of the contacts of one of the switches of each pair of switches, the neutral side of said circuit being connected to each pair of switches, the remaining contacts of all switches being connected to a common conductor.

7. The combination defined by claim 6 further characterized in that the light of one of the colors is provided by a pair of lamps which are connected between the movable contact members of the pair of switches associated therewith, the connection including switching means by which the lamps of said pair may be connected in series or in parallel with each other.

ROLLO GILLESPIE WILLIAMS.

References Cited in the file of this patent

UNITED STATES PATENTS

| Number | Name | Date |
|---|---|---|
| 1,613,337 | Weller | Jan. 4, 1927 |
| 1,731,772 | Greenwalt | Oct. 15, 1929 |
| 1,911,911 | Marsh | May 30, 1933 |
| 1,945,635 | Greenwalt | Feb. 6, 1934 |